Aug. 19, 1930.  K. K. HUPPMANN  1,773,489
DRIVING MECHANISM
Filed Sept. 5, 1929
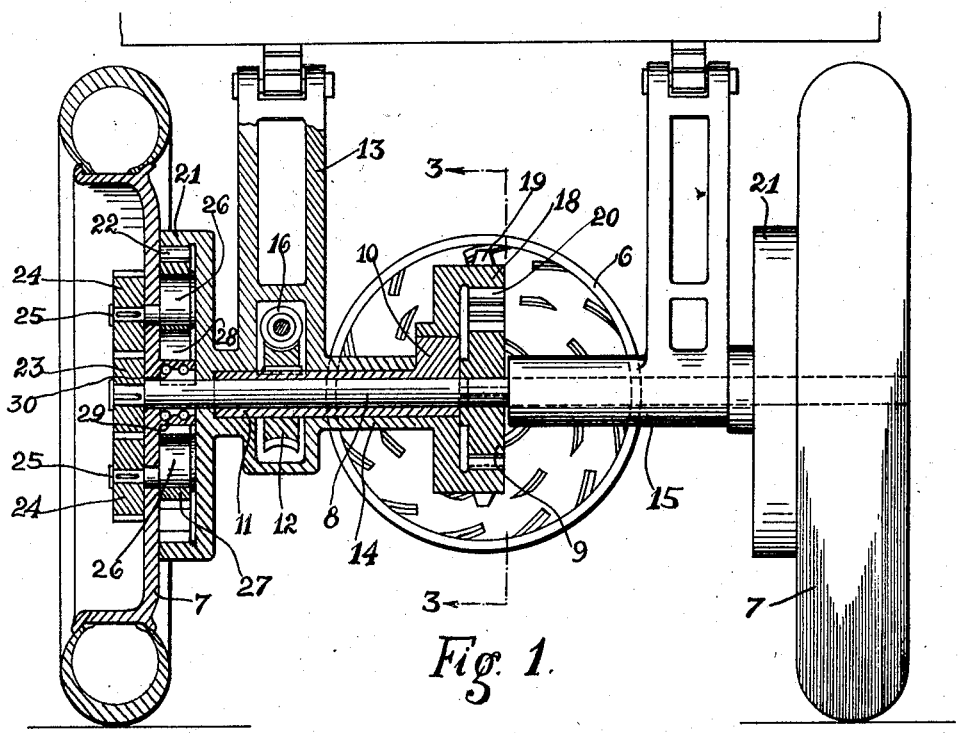
Fig. 1.
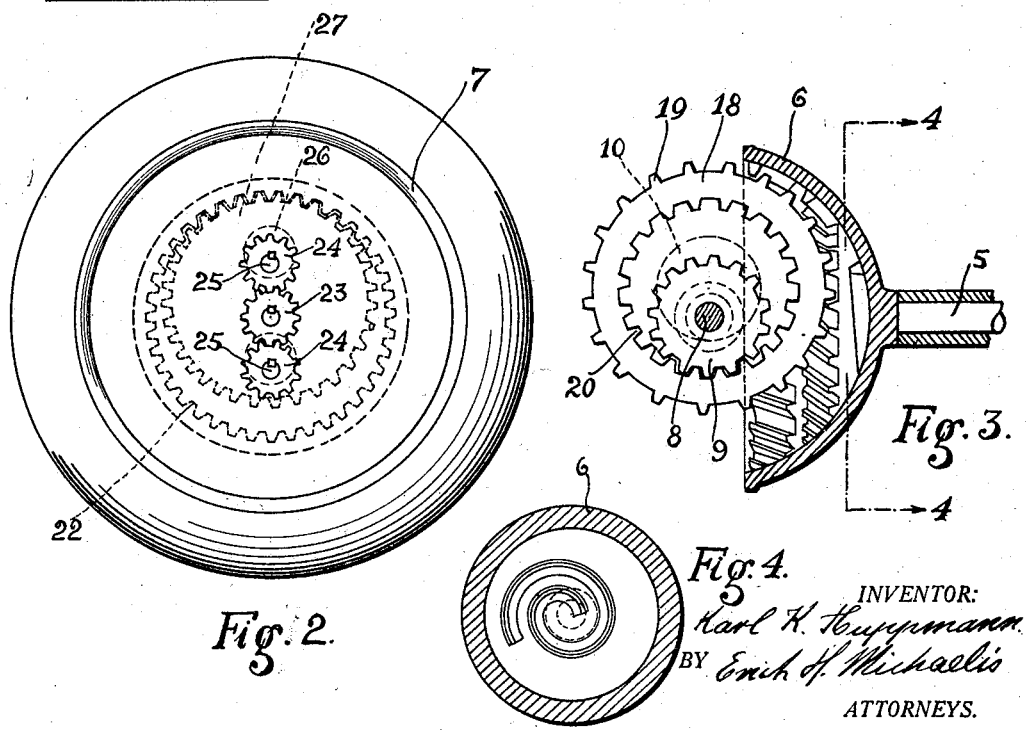
Fig. 2.
Fig. 3.
Fig. 4.
INVENTOR:
Karl K. Huppmann
BY Erich H. Michaelis
ATTORNEYS.

Patented Aug. 19, 1930

1,773,489

UNITED STATES PATENT OFFICE

KARL K. HUPPMANN, OF CICERO, ILLINOIS

DRIVING MECHANISM

Application filed September 5, 1929. Serial No. 390,479.

The invention relates to driving mechanisms and more especially to driving mechanisms of that type used in connection with automobiles for propelling the same.

The object of the invention is to provide a driving mechanism having different speeds and means for adjusting the mechanism easily and quickly for said different speeds.

Another object of the invention is to provide said mechanism with differential gears, which will automatically permit the acceleration of that driven wheel of the automobile, which has to rotate faster than the other one, when the automobile is driven in a curve.

Other objects of the invention not specifically mentioned may be easily ascertained and understood from the following description in connection with the accompanying drawings forming a part thereof. It is however to be noted, that the invention is not to be limited or restricted to the exact construction or formation shown in the drawings and described in the specification, but that the invention is only to be limited by the scope of the claims appended hereto.

In the drawings illustrating a preferred embodiment of the invention:

Fig. 1 is an end view of the mechanism driving the driven wheels of an automobile, said view being partly shown in section.

Fig. 2 is a side view of Fig. 1.

Fig. 3 is a sectional view taken on line 3—3 of Fig. 1.

Fig. 4 is a sectional view taken on line 4—4 of Fig. 3.

The motor, and transmission connected with said motor and used with the mechanism forming the subject matter of the present application may be of any desired and convenient construction and since they do not form a part of the present invention, they are neither shown nor described. A shaft 5 is driven by said motor and in turn drives the mechanism rotating the driven wheels of the automobile. On said shaft 5 a semi-globular member 6 is rigidly mounted, so that this member will be rotated together with the shaft 5. In this globular member a plurality of sets of internal worm gear teeth are provided, similar to the internal worm gear described in my co-pending application No. 380,565 filed July 24, 1929 on transmissions. In the drawings three sets of such internal worm gear teeth are indicated permitting the automobile, equipped with this mechanism, to be driven at three different speeds.

The two driven wheels 7 of the automobile are mounted loosely on a common shaft 8, which extends at right angles to the driving shaft 5. Adjacent the center between the two driven wheels a spur gear 9 is rigidly mounted on the driven shaft 8. An eccentric 10 is rotatably mounted on the driven shaft 8 and has a hollow neck 11, on which a worm gear 12 is rigidly mounted. On the frame 13 of the automobile journals 14 and 15 are formed, serving as bearing for the eccentric neck and for the driven shaft 8 respectively. A worm 16 meshes with the worm gear 12 and may be journalled on the frame in any suitable manner and may be rotated by any convenient means upwardly by the driver of the automobile. On the eccentric 10 a special gear, which shall be called a box gear 18, is rotatably mounted by means of a box like body. This gear 18 is provided with a set of outer teeth 19, which are adapted to mesh and to co-operate with the different sets of teeth provided in the internal worm 6. In addition to the outer teeth 19 the box gear is provided with a set of internal teeth 20 adapted to mesh and to co-operate with the spur gear 9 mounted on the driven shaft 8.

It is easy to see, that when the internal worm gear 6 is being rotated by means of the driving shaft 5 and when at that time the outer teeth 19 are in mesh with any one of the sets of teeth in said internal worm gear, the box gear will be rotated and since the spur gear 9 is in mesh with the internal teeth of said box gear and said spur gear is rigidly mounted on the shaft 8, said shaft 8 will be rotated also.

By adjusting the eccentric 10 by means of the worm 16 and worm gear 12 it is possible to bring the outer teeth 19 of the box gear into engagement with any one set of the teeth in the internal worm 6. By adjusting the eccentric so that the outer teeth of the box gear will be in engagement with the teeth above the horizontal center plane of the globular member, the box gear will be turned in one direction, but when the eccentric is then adjusted, so that the outer teeth of the box gear will engage the teeth of the internal worm gear below said horizontal plane the box gear will be rotated in the opposite direction. When this happens the rotation of the axle 8 will also be reversed. This shows clearly, that the axle may be driven in different speeds forward and rearward without reversing the rotation of the driving shaft 5.

On each of the journals 15 of the frame of the automobile a circular box 21 is formed adjacent each of the driven wheels 7, and the common axle 8 extends through said boxes. In each of said boxes inner teeth 22 are provided for a purpose to be described later on.

Adjacent the outer surface of each of the wheels 7, a comparatively small spur gear 23 is rigidly mounted on the common shaft 8. Two other spur gears 24 of the same size and the same pitch as the spur gear 23 mesh with the spur gear 23 and are rigidly mounted on short shafts 25, which are rotatably journalled in the wheel 7 and are arranged diametrically opposite to each other in relation to the central gear 23. On the inner end of the short shafts 25, an eccentric 26 is rigidly mounted, so that the eccentricity of said two members will be always the same. Said eccentrics are rotatably arranged in holes provided for this purpose in a spur gear 27, which is positioned between the wheel 7 and inside the box like member 21, formed on the journals 14 and 15. The spur gear 27 is provided with a central hole 28 and meshes with the internal teeth 22 on the box like member 21.

In order to reduce the friction between the driven wheels 7 and the common axle 8, the wheels may be provided with a hub 29 extending inwardly and a ball bearing 30 or the like may be arranged between said hub and the axle 8.

When the common axle 8 is driven in the manner described above and the automobile is traveling straight ahead the three interlocking spur gears 23, 24 and 24 will rotate with each other as one unit about the axis of the axle.

In consequence the wheel 7 will also be rotated since the short shafts 25 of the spur gears 24 will take it along. The spur gear 27 inside the box like member 21 will also be moved and will travel around in said box like member meshing with the inside teeth thereof. When however the automobile turns into a curve whereby naturally the one driven wheel has to travel faster than the other one, the two spur gears 24 will be carried along with the wheel which travels faster than the other one, so that they will perform a planetary movement about the central spur gear 23. Through this movement of the spur gears 24 the eccentrics 26 will also be operated, so that these eccentrics will rotate in the holes provided for them in the spur gear 27 and this last named spur gear will be moved inwardly of the box like member 21, so that it will be rotated with the wheel 7, but at the same time will be taken out of engagement with the inner teeth 22 of the box like member, so that no braking effect may occur, but that the wheel can travel freely.

Fig. 2 shows plainly, that a comparatively great number of the teeth of the spur gear 27 are in engagement with the inner teeth 22 of the box like member 21. When therefore the rotation of the wheels is stopped, a good braking effect is obtained by the great number of interlocking teeth 22 and 27.

Having described my invention and how the same is to be performed, I claim as new and desire to secure by Letters Patent:

1. In a device of the class described a semi-globular member, a plurality of sets of worm gear teeth in said member, said member adapted to be rotated, a rotatably journalled axle extending at right angles to the axis of the semi-globular member, an eccentric adjustably mounted on said axle, a box gear rotatable on said eccentric, outer teeth on said box gear adapted to be put into engagement with the different sets of teeth in the semi-globular member, internal teeth on the box gear and a spur gear rigidly mounted on said axle and meshing with the internal teeth of the box gear.

2. In combination with an automobile a semi-globular member adapted to be rotated by the motor of the automobile, a plurality of sets of worm gear teeth inside of said globular member, an axle extending at right angles to the axis of rotation of said globular member, an automobile wheel rotatably mounted adjacent each end of said shaft, an eccentric adjustably mounted on said axle, a box gear rotatably mounted on said eccentric, a set of outer teeth arranged on said box gear and adapted to be put into engagement selectively with the different sets of internal worm gear teeth of the globular member, a set of internal gear teeth on the box gear, a spur gear rigidly mounted on said axle and meshing with the inner teeth of the box gear, a comparatively small spur gear rigidly mounted on each outer end of said axle, a plurality of short shafts rotatably arranged in each wheel, a spur gear rigidly mounted on each short shaft and meshing with the gear on the end of the axle, an internal gear rigidly connected with the frame of the automobile, said axle extending rotatably through the center of the internal gear, an eccentric rigidly fastened to the inner end of each of the short shafts and a spur gear meshing with the internal gear and having holes therein adapted to receive the eccentrics on the short shafts.

In witness whereof I affix my signature.

KARL K. HUPPMANN.